United States Patent [19]
Tarulli et al.

[11] Patent Number: 5,851,623
[45] Date of Patent: Dec. 22, 1998

[54] PROTECTIVE COVER FOR A HAND OPERATED COMPUTER CONTROL DEVICE

[76] Inventors: Daniel J. Tarulli, 7 Huron St., Glen Head, N.Y. 11545; Thomas Clark, 20 Deacon Dr., York, Me. 03909

[21] Appl. No.: 724,754

[22] Filed: Oct. 3, 1996

[51] Int. Cl.⁶ .............................. B32B 1/04; B32B 1/08; H01H 13/04
[52] U.S. Cl. ........................ 428/68; 428/34.1; 200/333; 200/329; 200/330; D14/100; D14/114
[58] Field of Search .................. 428/34.1, 68; D14/100, D14/114; 200/333, 229, 330

[56] References Cited

U.S. PATENT DOCUMENTS

| | | | |
|---|---|---|---|
| D. 291,203 | 8/1987 | Silver | D14/114 |
| D. 359,037 | 6/1995 | Siano, Jr. | D14/114 |
| D. 361,557 | 8/1995 | Siano, Jr. | D14/114 |
| D. 361,558 | 8/1995 | Siano, Jr. | D14/114 |
| D. 361,559 | 8/1995 | Siano, Jr. | D14/114 |
| D. 369,154 | 4/1996 | Powell | D14/114 |
| D. 381,015 | 7/1997 | Morrison et al. | D14/114 |
| 4,298,778 | 11/1981 | Beresford-Jones | 200/302 |
| 4,831,736 | 5/1989 | Bryant, Sr. | 33/1 M |
| 4,880,968 | 11/1989 | Kwang-Chien | 250/221 |
| 5,051,550 | 9/1991 | Harris | 200/330 |
| 5,096,317 | 3/1992 | Phillippe | 400/714 |
| 5,122,785 | 6/1992 | Cooper | 340/710 |
| 5,245,146 | 9/1993 | Florence | 200/330 |
| 5,287,089 | 2/1994 | Parsons | 345/156 |

FOREIGN PATENT DOCUMENTS 6124624  5/1994  Japan ........................... H01H 25/04

*Primary Examiner*—Lynette F. Smith
*Assistant Examiner*—Brett Nelson
*Attorney, Agent, or Firm*—Aquilino & Welsh

[57] ABSTRACT

A protective cover for a hand operated computer control device. The device includes a cover having a cavity shaped to receive a control device such that the control device is releasably held within the cavity. The cover further includes weakened sections creating a push button member oriented to be adjacent a button on the control device when the control device is positioned within the cover. The push button member is moveable into the cavity to engage and actuate a button on the control device when a user presses down on the push button member.

8 Claims, 3 Drawing Sheets

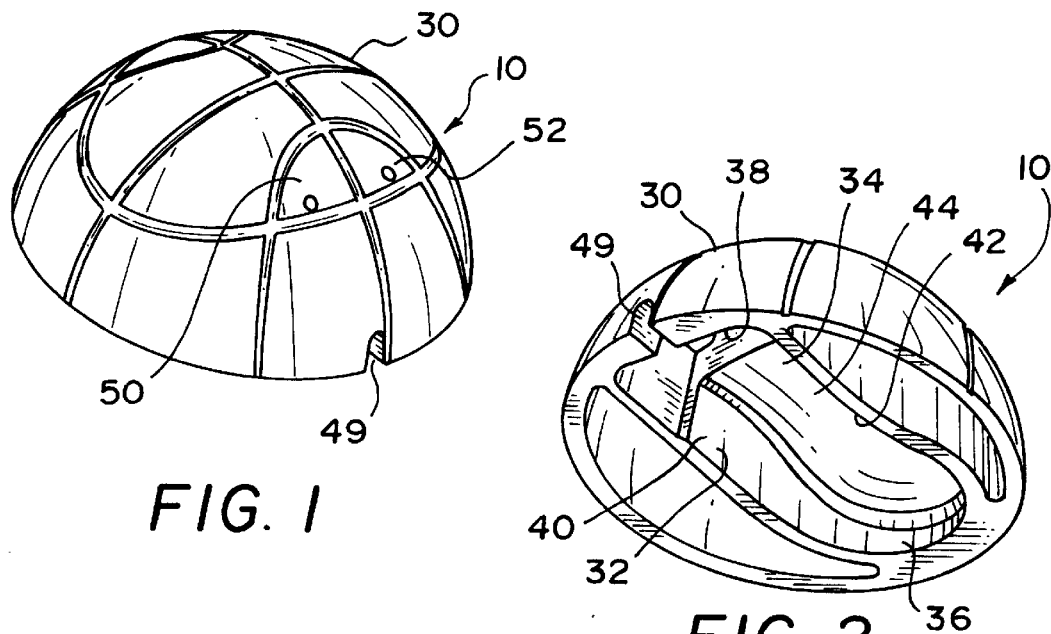
FIG. 1
FIG. 2
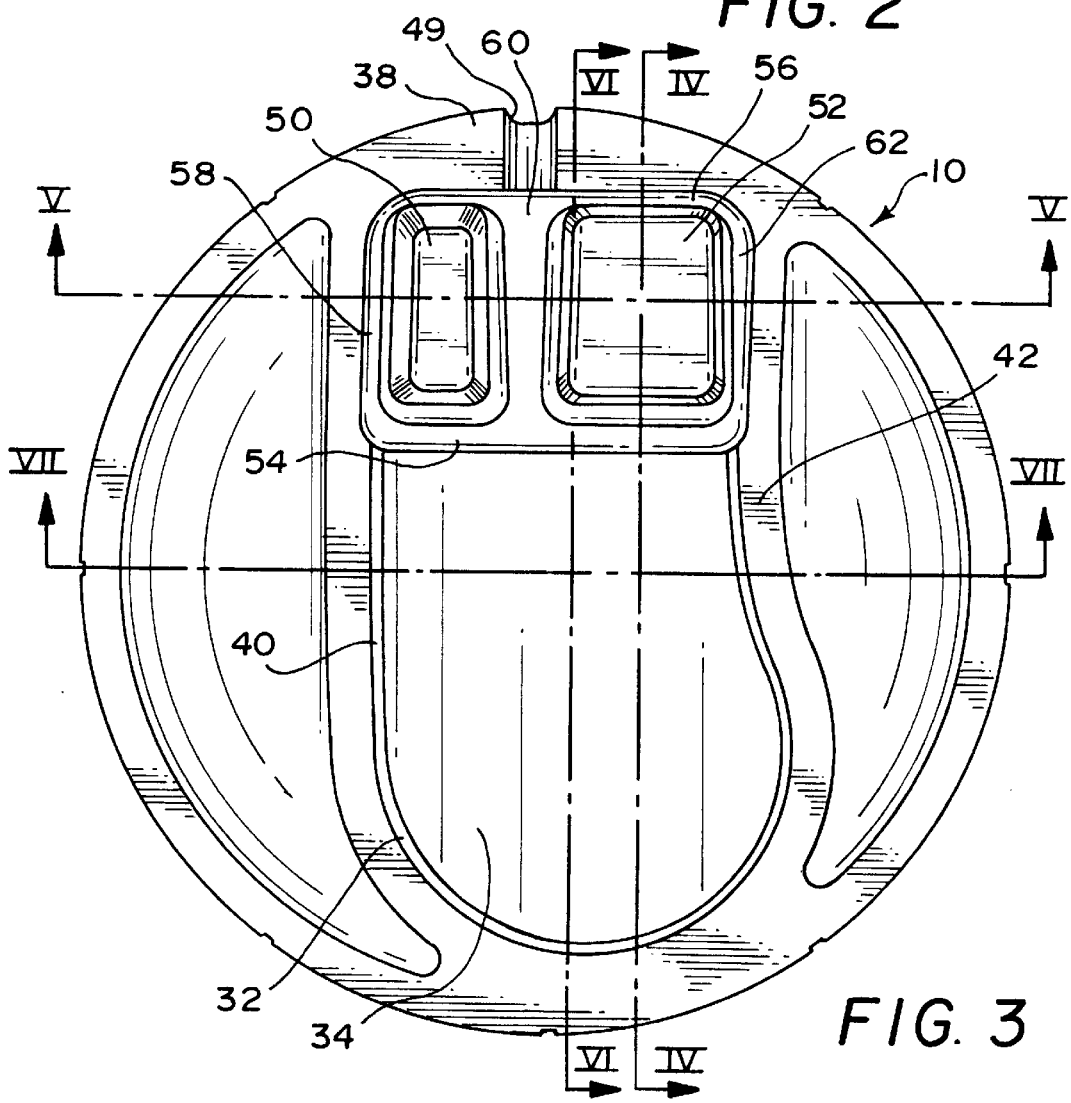
FIG. 3

PROTECTIVE COVER FOR A HAND OPERATED COMPUTER CONTROL DEVICE

BACKGROUND OF THE INVENTION

1. Field of the Invention

The invention relates to a protective cover for a hand operated computer control device. More particularly, the invention relates to a cover for a computer control device commonly referred to as a mouse, which protects the mouse and permits a user to actuate the buttons located on the mouse.

2. Description of the Prior Art

The use of hand controllers for controlling the position of a cursor on a computer display and for generating signals in a computer is well known. These controllers are commonly referred to as a "mouse". Generally, a mouse is used to move a cursor to specific locations on a CRT screen. When the cursor is appropriately positioned, buttons on the mouse are pressed to provide the computer with commands in a manner prescribed by the display on the screen. For example, if an individual wishes to print a document, he or she simply moves the cursor, via the mouse, to a box identifying a print function. When the cursor is moved to the box, a button on the mouse is pressed and the computer is actuated to perform the printing function.

Accordingly, a conventional mouse is provided with a roller ball on its lower surface so that the mouse may be moved on a support pad. Movement of the mouse on the support pad causes the ball to roll. Rolling of the ball sends signals which move the cursor on the CRT screen in the same direction as the mouse. As such, the cursor on the CRT screen follows approximately the same motion as the mouse in the user's hand. The mouse is also provided with a plurality of buttons which a user may press to actuate functions on the CRT screen.

Since a mouse contains substantial electronic circuitry, it is advantageous to protect a mouse from outside contaminants. Prior attempts have been made to protect a mouse, however, these attempts have often limited the usefulness of the roller or the buttons on the surface of the mouse. As such, a need continues to exist for a cover which protects a mouse, but provides a user with the required access to the roller and the buttons. The present invention provides such a protective cover.

SUMMARY OF THE INVENTION

It is, therefore, an object of the present invention to provide a protective cover for a hand operated computer control device. The device includes a cover having a cavity shaped to receive a control device such that the control device is releasably held within the cavity. The cover further includes weakened sections creating a push button member oriented to be adjacent a button on the control device when the control device is positioned within the cover. The push button member is moveable into the cavity to engage and actuate a button on the control device when a user presses down on the push button member.

It is also an object of the present invention to provide a protective cover including a continuous upper surface.

It is another object of the present invention to provide a protective cover that is a single piece construction.

It is a further object of the present invention to provide a protective cover including a plurality of resilient weakened sections, wherein the push button member is defined by the plurality of resilient weakened sections.

It is also an object of the present invention to provide a protective cover wherein the plurality of resilient weakened sections are thin walled recesses formed in the cover.

It is another object of the present invention to provide a protective cover formed from a resilient material, wherein the cover includes structure for releasably securing the control device within the cavity.

It is a further object of the present invention to provide a protective cover wherein the cavity is defined by a rear wall, a front wall, a first side wall, a second side wall, and a top wall. The rear wall includes a rear lip and the front wall includes a front lip, such that the rear lip and the front lip engage the control device to releasably secure the control device within the cavity.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a top perspective view of the protective cover.

FIG. 2 is a bottom perspective view of the protective cover.

FIG. 3 is a bottom view of the protective cover.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 4:
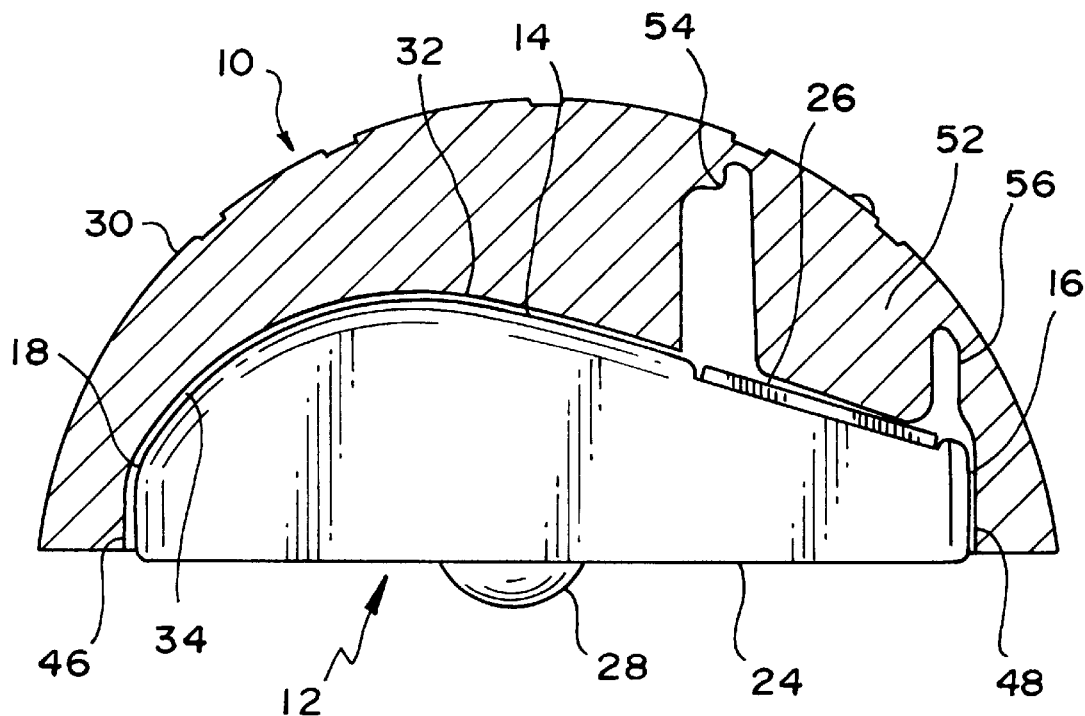
FIG. 4 is a cross-sectional view of the protective cover along the line IV—IV in FIG. 3.
Figure 5:
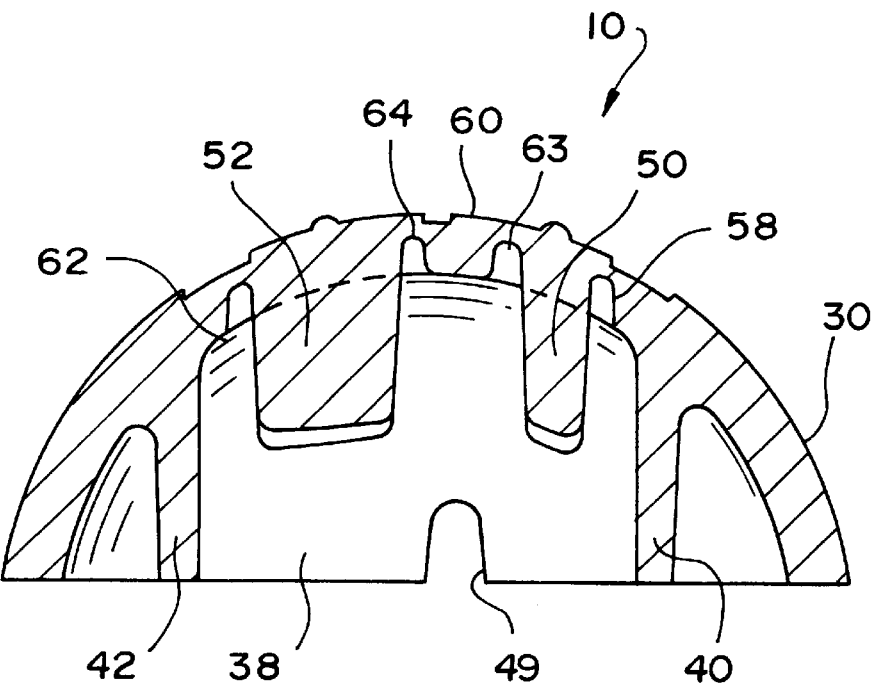
FIG. 5 is a cross-sectional view of the protective cover along the line V—V in FIG. 3.

With reference to FIGS. 1, 2 and 4, a protective cover 10 for a hand operated computer control device 12 is disclosed. The preferred control device 12 is a device commonly referred to as a mouse, and includes an upper surface 14 shaped for engagement with the hand of a user. The mouse includes a front end 16, a rear end 18, a first side (not shown), a second side (not shown), and a bottom 24. The front end 16 of the mouse 12 is provided with a series of buttons 26 (only one shown) which a user presses to activate certain functions shown on a CRT screen. While the embodiment shown in FIG. 1 discloses a mouse with two buttons, the mouse could be provided with more, or less, buttons without departing from the spirit of the present invention.

The mouse 12 is also provided with a roller ball 28 secured to the bottom 24 of the mouse 12. The roller ball 28 is coupled to electronics which permit a user to move a cursor on a CRT screen by simply moving the mouse 12 along a support surface. While the embodiment shown in FIG. 1 includes a roller ball for controlling the movement of a cursor, other structures could be used without departing from the spirit of the invention.

The cover 10 is shown in detail in FIGS. 1, 2, 3 and 5–8, and includes a continuous upper surface 30 shaped for engagement by the hand of a user. The cover 10 is a one piece construction and is preferably formed from a resilient material. For example, the cover may be manufactured from rubber, resilient polymers, or other materials suitable for practicing the present invention. The upper surface may take on a variety of aesthetically desirable shapes. For example, the embodiment disclosed in the present application is shaped to resemble a basketball.

The cover 10 includes a bottom recessed surface 32 which defines a cavity 34. The cavity 34 is shaped to receive the upper surface 14 of the mouse 12 such that the mouse 12 is releasably held within the cavity 34. Specifically, the cavity 34 is defined by a rear wall 36, a front wall 38, a first side wall 40, a second side wall 42, and a top wall 44. The rear wall 36 is provided with a rear lip 46 and the front wall 38 is provided with a front lip 48. The front lip 48 and the rear lip 46 are shaped to respectively engage the front end 16 and the rear end 18 of the mouse 12. As a result, a mouse 12 is releasably secured within the cavity 34 when an individual pushes the mouse 12 within the cavity such that the front and rear lips 48, 46 engage the mouse. When an individual wishes to remove the mouse 12 from within the cavity 34, he or she simply stretches the cover 10 slightly and pulls the mouse 12 from within the cavity 34. In addition, the front wall 38 of the cover 10 includes an opening 49 through which the cord secured to the front end 16 of the mouse 12 may pass. As one of ordinary skill in the art will certainly appreciate, the cavity may be shaped in a variety of manners to permit the acceptance of a wide variety of mouse shapes. Such modifications of the cavity are considered to be within the spirit of the present invention. In addition, the protective cover 10 could be provided with additional structures for securing the mouse 12 within the cavity 34. For example, latches, straps, or projections may be employed without departing from the spirit of the present invention.

With reference to FIGS. 1 and 3–6, the cover 10 is provided with two push button members 50, 52 for engaging the buttons of the mouse 12 when the mouse 12 is positioned within the cavity 34 of the cover 12. As one of ordinary skill in the art will appreciate, the cover could be constructed with any number of push button members without departing from the spirit of the present invention.

A plurality of resilient weakened sections define the first push button member 50 and the second button 52. Specifically, a first lateral weakened section 54 is created by forming a recess in the top wall 44 of the cavity 34. The first lateral weakened section 54 extends between the first side wall 40 and the second side wall 42 at a position slightly forward of the center line of the cover 10. This creates a thin walled section in the cover 10 which is more flexible than the remainder of the cover 10. Similarly, a second lateral weakened section 56 is created by forming a recess in the top wall 44 of the cavity 34. The second lateral weakened section 56 extends between the first side wall 40 and the second side wall 42 at a position adjacent the front wall 38 of the cover 10. As with the first weakened section 54, this creates a thin walled section in the cover 10 which is more flexible than the remainder of the cover 10.

Figure 6:
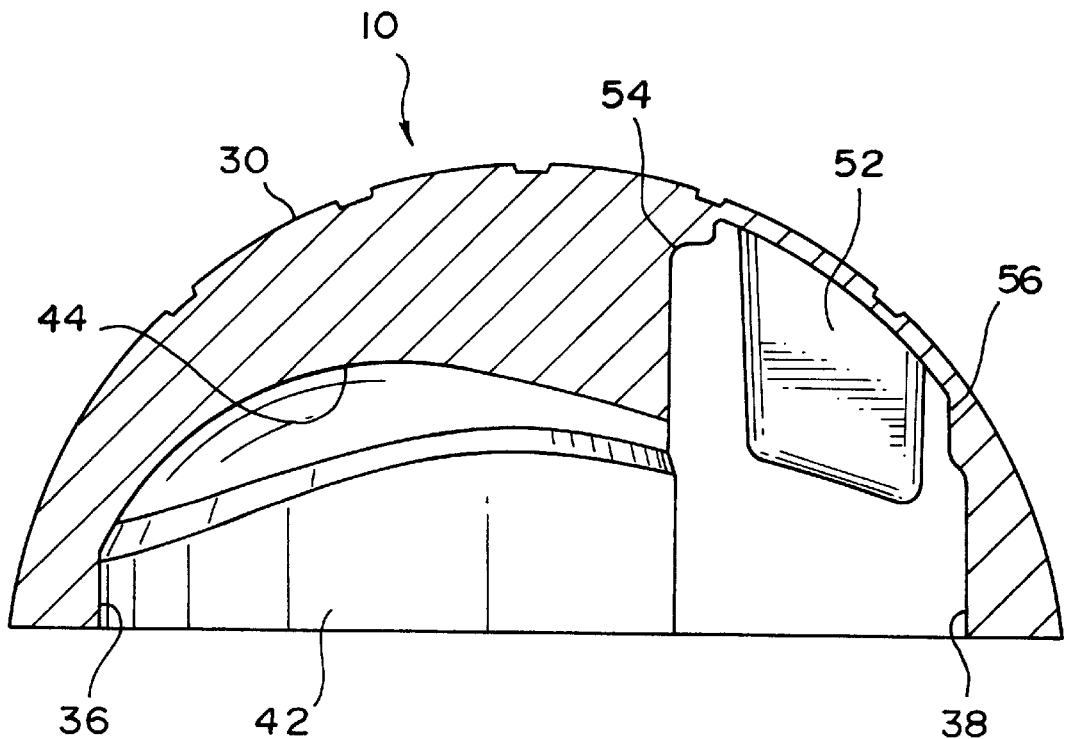
FIG. 6 is a cross-sectional view of the protective cover along the line VI—VI in FIG. 3.
Figure 7:
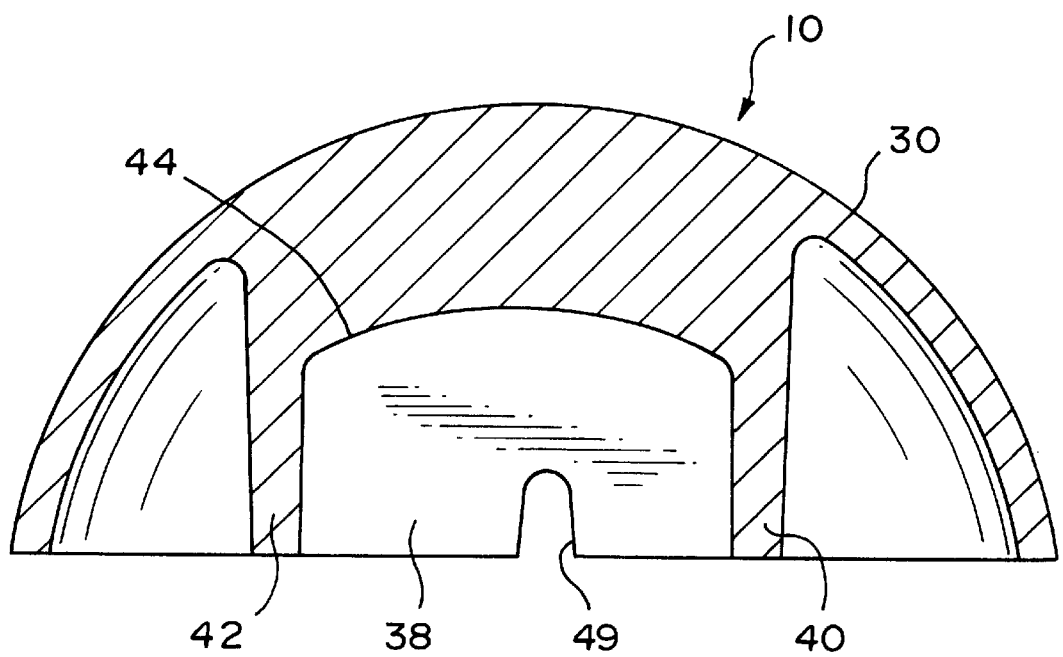
FIG. 7 is a cross-sectional view of the protective cover along the line VII—VII in FIG. 3.

The cover 10 is further provided with, and the first and second push button members 50, 52 are further defined by, a first longitudinal weakened section 58, a second longitudinal weakened section 60, and a third longitudinal weakened section 62. The first longitudinal weakened section 58 extends between the first lateral weakened section 54 and the second lateral weakened section 56 adjacent the first side wall 40 of the cover 10, the second longitudinal weakened section 60 extends between the first lateral weakened section 54 and the second lateral weakened section 56 substantially at the center of the cover 10, and the third longitudinal weakened section 62 extends between the first lateral weakened section 54 and the second lateral weakened section 56 adjacent the second side wall 42 of the cover 10. With reference to FIG. 6, actuation of the first and second push bottom members 50, 52 is enhanced by the provision of first and second grooves 63, 64 respectively adjacent the first and second push button members 50, 52. The first and second grooves 63, 64 provide additional flexibility permitting the first and second push button members 50, 52 to move more freely.

As a result the first push button member 50 is defined by the first lateral weakened section 54, the second lateral weakened section 56, the first longitudinal weakened section 58, and the second longitudinal weakened section 60, and the second push button member 52 is defined by the first lateral weakened section, the second lateral weakened section 56, the second longitudinal weakened section 60 and the third longitudinal weakened section 62. The weakened sections defining the first and second push button members 50, 52 permit the push button members to move within the cavity 34 when an individual presses on the push button members. As a result, a user may press the push button member to actuate the buttons on the mouse while the cover is on the mouse. The provision of the weakened sections to create a push button members provides a user access to the buttons on the mouse, while still providing a cover having a continuous surface to prevent undesirable materials from slipping under the cover.

While the preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A protective cover for a hand operated computer control device, wherein the hand operated computer control device includes a control device upper surface, upon which is positioned at least one button for activating certain functions of a computer, and a cursor controller coupled to electronics for permitting a user to move a cursor on a monitor by simply moving the hand operated computer control device along a support surface, the protective cover comprising:

a cover including a cavity shaped to receive a hand operated computer control device such that the hand operated computer control device is releasably secured within the cavity;

the cover further includes a continuous, one piece upper surface preventing undesirable materials from slipping under the cover and damaging the hand operated computer control device, and the cover also includes a push button member defined by weakened sections formed in the cover such that the continuous, one piece upper surface of the cover is maintained, the push button member is oriented to be adjacent a button on the hand operated computer control device when the hand operated controller control device is positioned within the cover; and wherein the push button member is moveable into the cavity to engage and actuate the button on the hand operated computer control device when a user presses down on the push button member.

2. A protective cover according to claim 1, wherein the cover is a single piece construction.

3. A protective cover according to claim 2, wherein the weakened sections are a plurality of resilient weakened sections, and the push button member is defined by the plurality of resilient weakened sections.

4. A protective cover according to claim 3, wherein the plurality of resilient weakened sections are defined by recesses, which create flexible sections in the cover, formed in the cover.

5. A protective cover according to claim 1, wherein the cover is formed from a resilient material and includes means for releasably securing the control device within the cavity.

6. A protective cover according to claim 5, wherein the cavity is defined by a rear wall, a front wall, a first side wall, a second side wall, and a top wall; and the rear wall includes a rear lip and the front wall includes a front lip, the rear lip and the front lip selectively engaging the control device to releasably secure the control device within the cavity.

7. A protective cover according to claim 1, wherein the weakened sections are a plurality of resilient weakened sections, and the push button member is defined by the plurality of resilient weakened sections.

8. A protective cover according to claim 7, wherein the plurality of resilient weakened sections are defined by recesses, which create thin walled flexible sections in the cover, formed in the cover.

\* \* \* \* \*